United States Patent [19]

Dhyanchand et al.

[11] Patent Number: 5,036,449

[45] Date of Patent: Jul. 30, 1991

[54] POWER SUPPLY AND METHOD FOR PRODUCING HIGH VOLTAGE HIGH POWER OUTPUTS IN RESPONSE TO VARIABLE VOLTAGE DC INPUTS

[75] Inventors: John J. Dhyanchand; Vietson M. Nguyen, both of Rockford, Ill.

[73] Assignee: Sundstrand Corporation, Rockford, Ill.

[21] Appl. No.: 447,573

[22] Filed: Dec. 7, 1989

[51] Int. Cl.$^5$ .................. H02M 3/24; H02M 7/44
[52] U.S. Cl. ........................ 363/15; 363/71; 323/299
[58] Field of Search .............. 363/15, 16, 65, 71; 323/299, 297

[56] References Cited

U.S. PATENT DOCUMENTS

| | | |
|---|---|---|
| 3,234,450 | 2/1966 | Jennings . |
| 3,790,877 | 2/1974 | Bailey . |
| 4,062,057 | 12/1977 | Perkins et al. ............. 363/71 |
| 4,587,604 | 5/1986 | Nerone ................... 363/17 |

FOREIGN PATENT DOCUMENTS

760350  9/1980  U.S.S.R. ...................... 363/71

Primary Examiner—William H. Beha, Jr.
Attorney, Agent, or Firm—Antonelli, Terry, Stout & Kraus

[57] ABSTRACT

A power supply for converting a variable DC input potential (12) to a regulated DC output potential in accordance with the invention includes a plurality of DC to DC converters (300), each converter operating in response to a DC input potential having an operating range, having an input for receiving a DC input potential which is variable in magnitude, and an output for producing the DC output potential, the outputs of the converters being coupled together; a variable voltage divider (18) having an input coupled to the variable input potential, a plurality of connected stages (100) coupled to the input potential, at least one control signal applied to the variable voltage divider for controlling a number of stages across which the variable input potential is dropped; a switching circuit (200), coupled between the variable voltage divider and the plurality of DC to DC converters, responsive to at least one switching control signal, for coupling an output potential developed by at least one of the stages to at least one of the converters as a DC input potential so that each converter to which an output potential from one of the stages is coupled has an input potential within an operating range of the converter; and a controller (500), responsive to the variable input potential, for generating the at least one control signal and the at least one switching signal as a function of the DC input potential.

40 Claims, 3 Drawing Sheets

| | SW1 ON | SW1 OFF | SW2 ON | SW2 OFF | SW3 ON | SW3 OFF | SW4 ON | SW4 OFF | |
|---|---|---|---|---|---|---|---|---|---|
| 5000 VDC | X | | | X | | X | | X | 400 TO 500 VDC |
| 4000 VDC | | X | | X | | X | | X | 333 TO 500 VDC |
| 3000 VDC | | X | X | | | X | | X | 375 TO 500 VDC |
| 2000 VDC | | X | | X | X | | | X | 333 TO 500 VDC |
| 1000 VDC | | X | | X | | X | X | | 250 TO 500 VDC |

FIG. 4

| | 20 | 22 | 24 | 26 | 28 | 30 | 32 | 34 | 36 | 38 | 40 | 42 | 44 | 46 | 50 | 52 | 54 | 56 | 60 | 62 | 64 | 70 | 72 | 74 | 80 | 82 | 90 | 92 |
|---|---|---|---|---|---|---|---|---|---|---|---|---|---|---|---|---|---|---|---|---|---|---|---|---|---|---|---|---|
| 5000 VDC | X | | | | | | | | | | | | | | | | | | | | | | | | | | | X |
| 4000 VDC | | X | | | | | | | | | | | | | | | | | | | | | | | | X | X | |
| 3000 VDC | | | X | | | | | X | | | | | | | | | | | | | | | X | | X | | | |
| 2000 VDC | | | | X | | | | | X | | | | X | | | | X | | | | X | X | | | | | | |
| 1000 VDC | | | | | X | X | X | | | X | X | X | | X | X | X | | X | X | X | | | | | | | | |

POWER SUPPLY AND METHOD FOR PRODUCING HIGH VOLTAGE HIGH POWER OUTPUTS IN RESPONSE TO VARIABLE VOLTAGE DC INPUTS

TECHNICAL FIELD

The present invention relates to power supplies for producing high power, high voltage AC or DC outputs from variable voltage DC inputs.

BACKGROUND ART

Power supplies are known which produce high voltage, high power regulated AC or DC outputs from a DC input potential which is subject to variation. These power supplies operate a plurality of DC to DC converters or inverters which each produce a regulated DC output potential which is combined by an output circuit to produce an output potential which is equal to the sum of the input potentials. However, the foregoing power supplies do not operate to produce a regulated output potential when the input potential is subject to variation of more than approximately 2:1.

Power supplies for space stations have been proposed which utilize a plurality of inverters or DC to DC converters which are operated in parallel to produce a regulated output AC or DC potential. However, these proposed designs must function in an environment where the input DC voltage will fluctuate by 10:1 or more. As a consequence of the high level of voltage fluctuation on the DC input potential, it is not possible to directly power a plurality of inverters or DC to DC converters which are driven by the variable input potential because of the 10:1 higher fluctuation will be far outside of the input potential fluctuation at which DC to DC converters or AC inverters may be operated to produce a regulated output potential.

DISCLOSURE OF INVENTION

The present invention provides a power supply for producing a voltage regulated high power output from a variable DC input potential having a large range of fluctuation greate than the range of fluctuation at which DC to DC converters or AC inverters may be operated to produce a regulated output potential. With the invention a voltage divider having a plurality of connected stages is connected to the variable input potential with the number of stages across which the variable input potential is dropped on resistances in the stages being connected to inputs of the DC to DC converters or inverters so that each DC to DC converter or inverter has an input potential within an operating range at which the DC to DC converter or inverter is designed to operate. A switching circuit is coupled between the outputs of the resistances and the inputs to the DC to DC converters or inverters with the conductivity of the switches within the switching circuit being controlled by a controller as a function of the input potential to connect the resistances of the stages to which the variable input potential is dropped to the inputs of the DC to DC converters or inverters. The controller further controls the switching state of a switch connected in parallel to each of the stages of the voltage divider to control the number of stages across which the variable input potential is dropped as a function of the magnitude of the variable input potential. The controller compares the variable input potential with a plurality of reference potentials to provide one or more input signals to a combinatorial logic circuit for producing signals for controlling the switching states of the switches within the switching circuit and the switches in parallel with the stages of the voltage divider.

A power supply for converting a variable DC input potential to a DC output potential in accordance with the invention includes a plurality of DC to DC converters, each converter operating in response to a DC input potential having an operating range, having an input for receiving a DC input potential which is variable in magnitude, and an output for producing the DC output potential, the outputs of the converters being coupled together; a variable voltage divider having an input coupled to the variable input potential having a range of potential variation larger than the operating range of the converters, a plurality of connected stages coupled to the input potential, at least one control signal applied to the variable voltage divider for controlling a number of stages across which the variable input potential is dropped; a switching circuit, coupled between the variable voltage divider and the plurality of converters, responsive to at least one switching control signal, for coupling an output potential developed by at least one of the stages to at least one of the converters as a DC input potential so that each converter to which an output potential from one of the stages is coupled has an input potential within the operating range of the converters; and a controller, responsive to the variable input potential, for controlling the at least one control signal and the at least one switching signal as a function of the DC input potential. The output potential of the converters is regulated. The outputs of the converters are coupled in series. Each voltage divider stage comprises at least one resistance with each resistance coupled in a series circuit having first and second nodes; a stage switch having first and second nodes respectively electrically connected to the first and second nodes of the series circuit and which are electrically connected together in response to one of the at least one control signals being applied to a control electrode to short circuit the series circuit and which are not electrically connected together in the absence of the one control signal. A total number of resistances in all of the voltage divider stages is equal to a total number of the converters in the power supply. The controller in response to the variable input potential controls the generation of the control signals to control the conductivity of the switches. The switching circuit comprises a plurality of converter selection switches, and the invention further comprises a plurality of the resistances each being connectable in parallel to one of the converters by first and second conductors connected respectively to first and second codes of the resistance and closure of a converter selection switch connected in one of the second conductors in response to one of the switching control signals. The first conductor connected to each resistance of the plurality of resistances is connected directly to one of the converters; and the second conductor connected to each resistance of the plurality of resistances is connected to at least one converter by closure of at least one converter selection switch which is connected to the second conductor.

The controller comprises a comparator circuit for comparing the variable DC input potential with a plurality of different voltage thresholds to determine a particular range within which the variable DC input potential falls within a plurality of different voltage ranges equal in number to the number of stages of the voltage divider; and a combinatorial logic circuit, coupled to the comparators, for producing the at least one control signal and the at least one switching signal in response to the range within which the DC input potential falls. The comparator circuit comprises at least one comparator with a number of comparators being equal to one less than a number of stages, each comparator having a pair of inputs with a first input being coupled to the variable input DC potential and a second input being coupled to a voltage threshold with the voltage thresholds being equally spaced apart.

A power supply for converting a variable DC input potential to an AC output potential in accordance with the invention comprises a plurality of inverters, each inverter operating in response to a DC input potential having an operating range, having an input for receiving a DC input potential which is variable in magnitude and an output for producing an AC output potential, the outputs of the converters being coupled together; a variable voltage divider having an input coupled to the variable input potential, a plurality of connected stages coupled to the input potential, at least one control signal applied to the variable voltage divider for controlling a number of stages across which the variable input potential is dropped; a switching circuit, coupled between the variable voltage divider and the plurality of inverters, responsive to at least one switching control signal, for controlling an output potential developed by at least one of the stages to at least one of the inverters as a DC input potential so that each inverter has an input potential within an operating range of the inverter; and a controller, responsive to the variable input potential, for generating the at least one control signal and the at least one switching signal as a function of the DC input potential. The outputs of the inverters are coupled in series. Each voltage divider stage comprises at least one resistance with each resistance coupled in a series circuit having first and second nodes; a stage switch having first and second electrodes respectively electrically connected to the first and second nodes of the series circuit and which are electrically connected together in response to one of the at least one control signal being applied to a control electrode to short circuit the series circuit and which are not electrically connected together in the absence of the one control signal. The total number of resistances in all of the voltage divider stages is equal to a total number of inverters in the power supply. The controller in response to the variable input potential controls the generation of the control signals to control the conductivity of the switches. The switching circuit comprises a plurality of inverter selection switches, and the invention further comprises a plurality of the resistances each being connectable in parallel to one of the inverters by first and second conductors connected respectively to first and second nodes of the resistance and closure of an inverter selection switch connected in one of the second connectors in response to one of the switching control signals. The first conductor connected to each resistance of the plurality of resistances is connected directly to one of the inverters; and the second conductor connected to each resistance of the plurality of resistances is connected to at least one inverter by closure of at least one inverter selection switch which is connected to the second conductor.

The controller comprises a comparator circuit for comparing the variable DC input potential with a plurality of different voltage thresholds to determine a particular range within which the variable DC input voltage falls within a plurality of different voltage ranges equal in number to the number of stages of the voltage divider; and a combinatorial logic circuit, coupled to the comparators, for producing the at least one control signal and the at least one switching signal in response to the range within which the DC input voltage falls. The comparator circuit comprises at least one comparator with a number of comparators being equal to one less than a number of stages, each comparator having a pair of inputs with a first input being coupled to the variable DC input potential and a second input being coupled to a voltage threshold with voltage thresholds being equally spaced apart.

A method of operating a plurality of DC to DC converters which each produce an output DC potential which is combined to produce a combined output potential with each converter converting a variable DC input potential having a range of potential variation larger than a range of potential variation over which the converters are to be operated in accordance with the invention includes applying the variable DC input potential to a voltage divider having a plurality of stages with each stage having at least one resistance which drops a fraction of the variable DC input potential; varying the number of stages to which the variable DC input potential is applied as a function of the input potential to cause a DC potential drop across the at least one resistance of at least one stage to which the variable DC input potential is applied to be within the range of variation that the DC converters are to be operated; and connecting each of the at least one resistance of the at least one stage to which the input potential is applied to at least one converter to cause each converter to be operated within the potential range the DC to DC converters are to be operated. The DC output potential of each converter is regulated. The combined output DC potential is equal to the sum of the DC output potentials produced by the individual converters.

A method of operating a plurality of inverters which each produce an AC output potential which is combined in an output circuit to produce an AC output potential with each inverter converting a variable DC input potential having a range of potential variation larger than a range of potential variation over which the inverters are to be operated in accordance with the invention includes applying the variable DC input potential to a voltage divider having a plurality of stages with each stage having at least one resistance which drops a fraction of the variable input potential; varying the number of stages to which the variable input DC potential is applied as a function of the input potential to cause a DC potential dropped across the at least one resistance of the stages to which the variable voltage is applied to be within the range of variation that the inverters are to be operated; and connecting each of the at least one resistance of the stages to which the input potential is applied to at least one inverter to cause each inverter to be operated within a potential range that the inverters are to be operated.

BEST MODE FOR CARRYING OUT THE INVENTION

Figure 1:
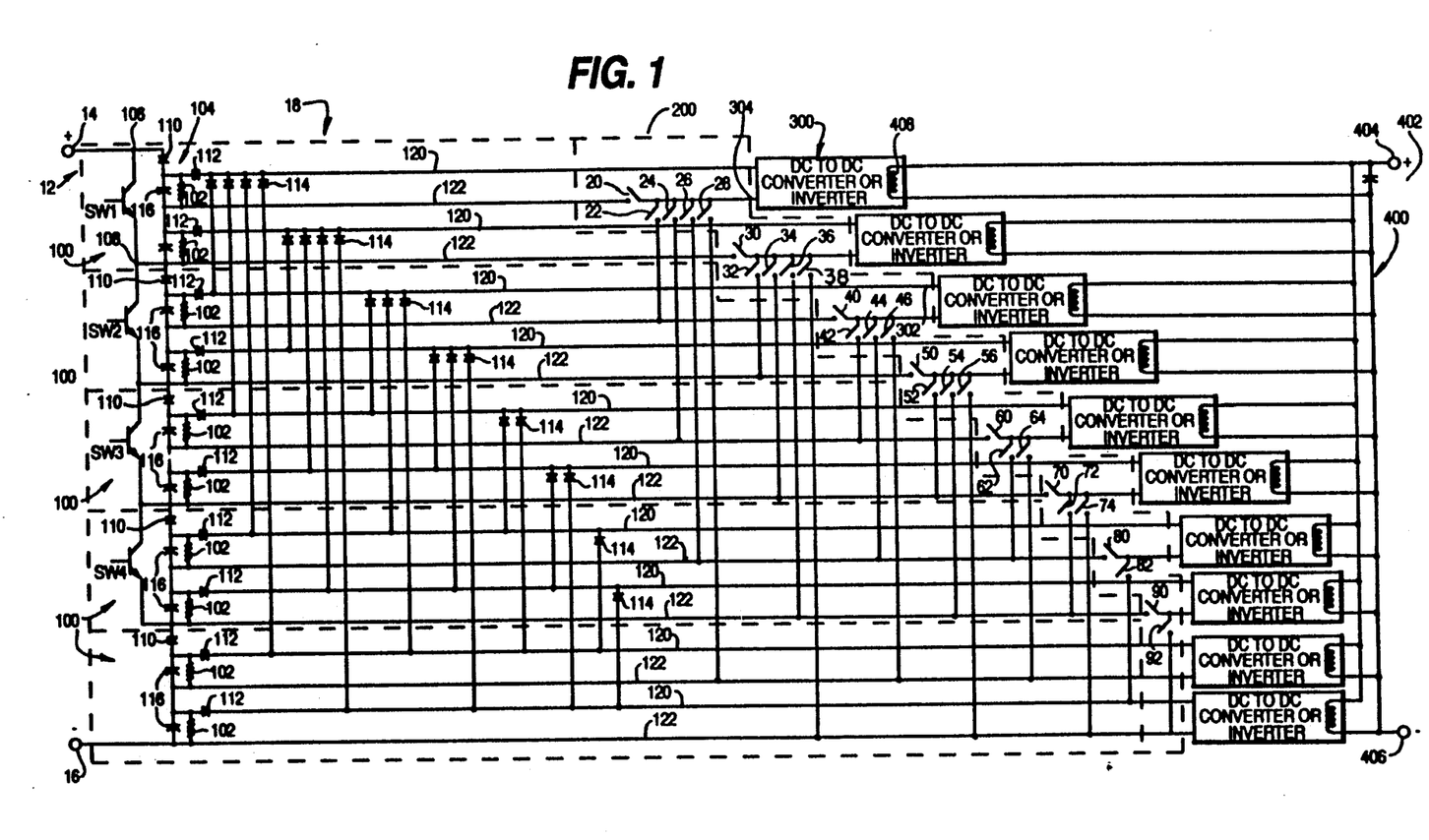
FIG. 1 illustrates the voltage divider, switching circuit and plurality of DC to DC converters or inverters in accordance with the present invention.
Figure 2:
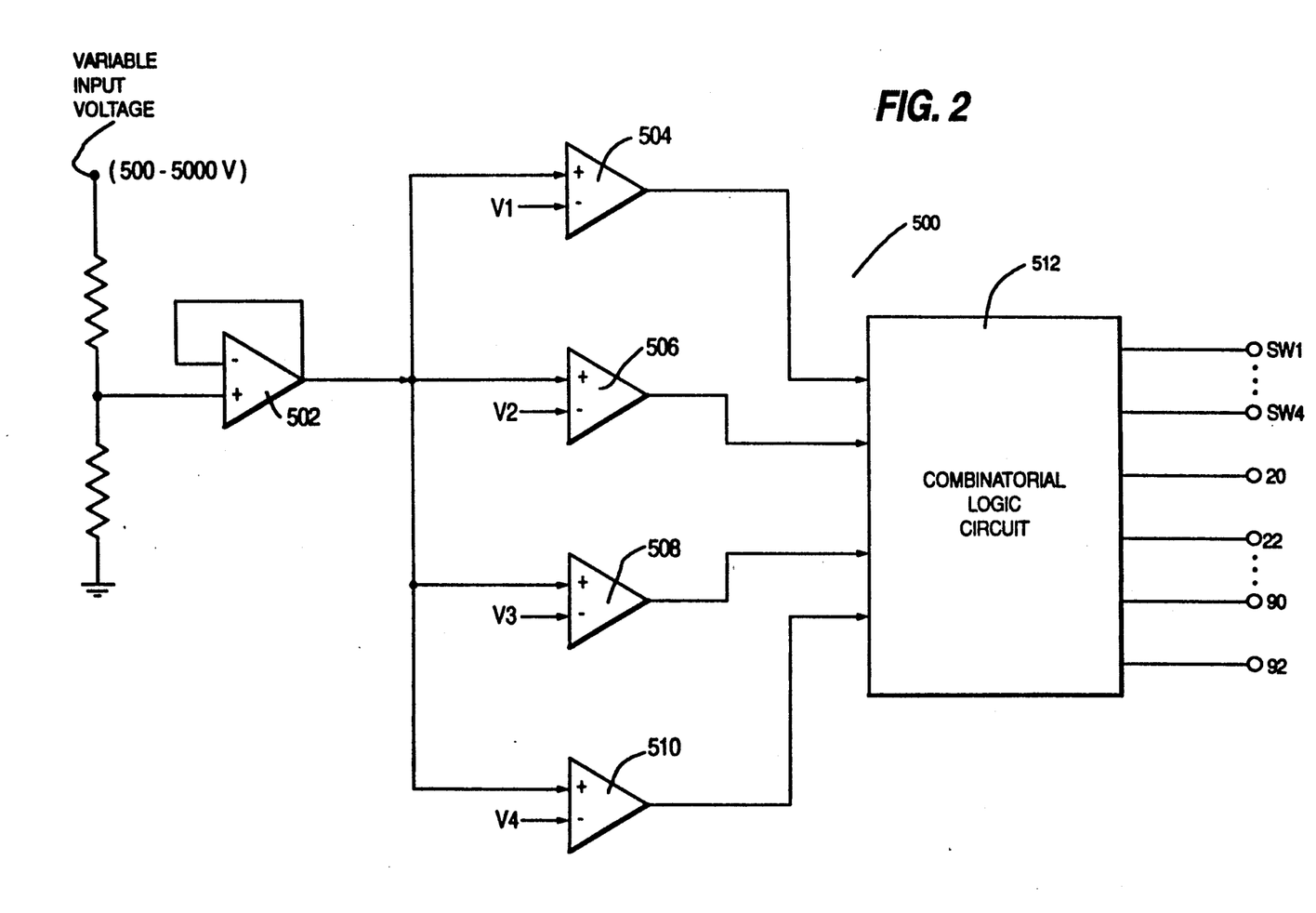
FIG. 2 illustrates a block diagram of controller which is used to generate the switching states of switches utilized in the voltage divider and switching circuit of FIG. 1.

FIGS. 1 and 2 illustrate an embodiment of the present invention which is a power supply for converting a variable DC input potential to either a regulated DC output potential or a regulated AC output potential. The main parts of the invention are a voltage divider 18 having a variable number of stages 100 which may be connected across variable input potential 12; a switching circuit 200 which controls connection of resistances 102 within the stages to DC to DC converters or inverters 300, an output circuit 400 and a controller 500. The design of the converters or inverters 300 is not part of the present invention. The variable DC input potential 12 which has a range varying in magnitude such as 10:1 or higher is supplied to input terminals 14 and 16. A voltage divider 18 having n stages 100 connected in series between the input terminals 14 and 16 functions to divide the input potential over a number of stages as a function of the DC input potential as described below. Each stage 100 is comprised of at least one resistance 102 with each resistance being contained in a series circuit 104 having a first node 106 and a node terminal 108 which is connected in parallel with a switch which permits selective bypassing of the resistances within the stage for dividing the input potential for application to a plurality of DC to DC converters or inverters 300 each of which produce a regulated output DC potential or regulated output AC potential in response to variation of the DC input potential over a maximum range of potential variations such as 2:1 which is less than the range of potential variation of the input voltage 12. Potential variations substantially larger than 2:1 prevent the converter or inverter from operating to produce a regulated output potential. A switching circuit 200 functions to selectively connect resistances 102 of the number of stages 100 across which the input potential is dropped under the control of controller 500 as a function of the input potential to each of the converters or inverters 300. A plurality of diodes 110, 112, and 114 are contained in each of the stages 100 for controlling the application of a positive input potential to one of the two input terminals of the converters or inverters to which a positive input potential is being applied. Capacitors 116 shunt noise to ground. Each resistance is coupled to a first conductor 120 which is connected directly to the positive input terminal 302 of the converter or inverter 300 and a second conductor 122 which is connected to at least one negative input terminal 304 of the converter or inverters 300. As the input potential 12 dynamically varies, the controller 500 varies the activation of switches SW1-SW4 to control the number of resistances 102 across which the input potential 12 is dropped to control the input potential to each of the converters or inverters 300 to be within the potential range of operation for which the converters or inverters are designed to be operated. An output circuit 400 is coupled to each of the converters or inverters for producing an output DC or AC potential which is equal to the sum of the individual potentials outputted by each of the DC to DC converters or inverters 300. It should be understood that each of the converters or inverters 300 may be one or more DC to DC converters or inverters such as ten which are connected in parallel with each of the converters or inverters having a regulated output voltage which is regulated in a manner conventional in the art and which is not described herein.

Figure 3:
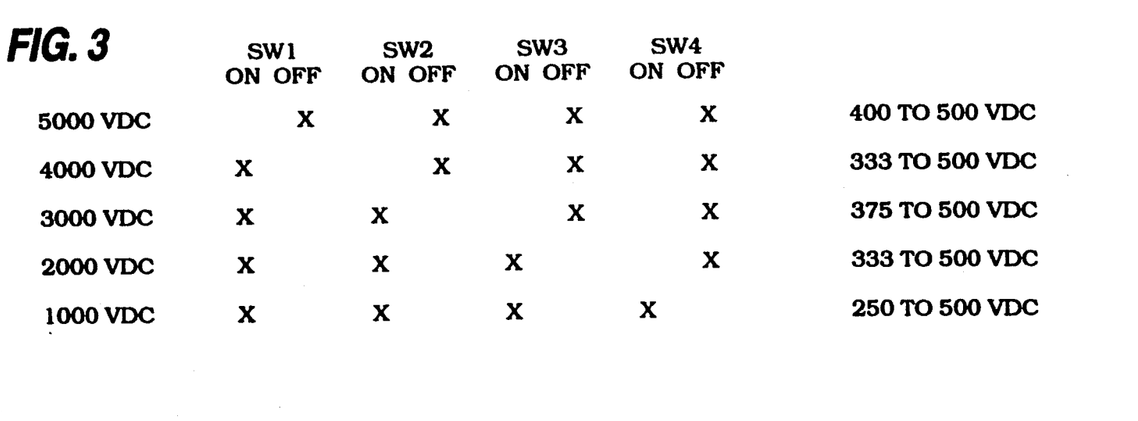
FIG. 3 illustrates a table of the switching states of the switches within the plurality of stages of the voltage divider as a function of variable DC input potential.
Figure 4:
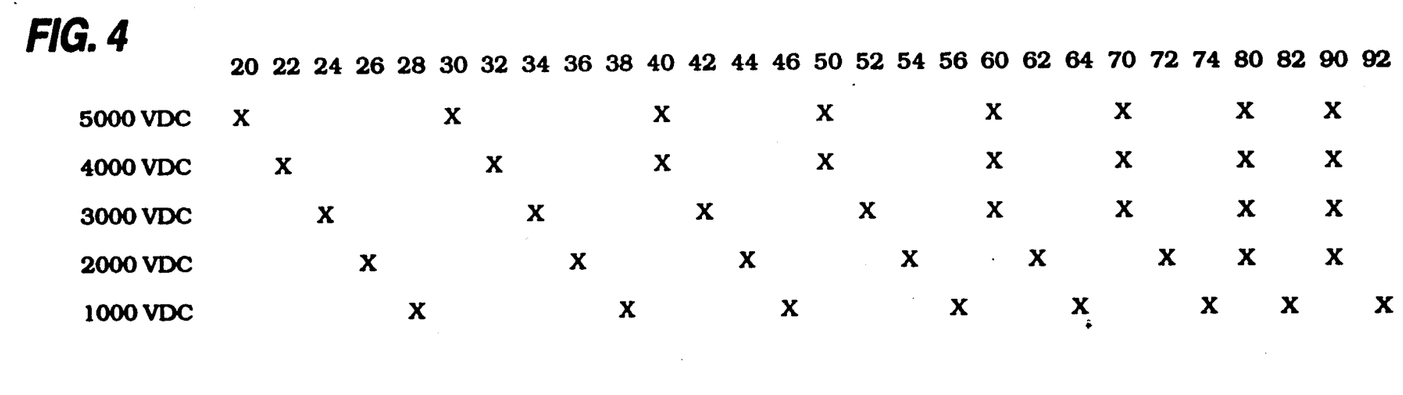
FIG. 4 illustrates the switching states of the switches of the switching circuit as a function of variable DC input potential.

The controller 500 functions to activate each of the switches SW1-SW4 and 20-92 in accordance with the switching states set forth in FIGS. 3 and 4. In a preferred form, the controller 500 is comprised of an amplifier 502 which is responsive to the variable input potential varying in magnitude over a range such as 10:1 or greater. The output potential from the amplifier 502 is applied to a comparator circuit having a plurality of comparators 504-510 which each have a pair of inputs. The comparators function to determine within which voltage range of a plurality of voltage ranges the variable input falls. The first input of each of the comparators 504-510 is connected to the output of the amplifier 502. Preferably, the number of comparators is one less than the number of stages 100 in the voltage divider 18. The second input to each of the comparators is a voltage threshold. The voltage thresholds V1-V4 are equally spaced apart by voltage intervals such as 1,000 volts to divide the variable input voltage into five ranges with the first range being zero to 1,000 volts, the second range being 1,000-2,000 volts, the third range being 2,000-3,000 volts, the fourth range being 3,000-4,000 volts, and the fifth range being 4,000-5,000 volts. Each of the comparators 504-510 produces a high level output signal when the output potential from the amplifier 502 is greater than the threshold voltage. A combinatorial logic circuit 512 is responsive to the output states from the comparators 504-510 to produce control signals SW1-SW4 for controlling the switching states of the switches SW1-SW4 of the stages 100 of the voltage divider 18 and switching signals 20-92 for controlling the switching states of the switches 20-92 of the switching circuit 200. The combinatorial logic circuit may be of any conventional design 512 for implementing the switching states for controlling the conductivity of the switches SW1-SW4 and 20-92 as a function of the variable input potential 12.

FIG. 3 illustrates the switching states produced by the combinatorial logic circuit 512 in response to the input potential 12 being in the five different ranges described above. For ranges from 500-1,000 volts DC each of the switches SW1-SW4 is activated to cause all of the input potential 12 to be dropped across the bottom stage 100 of the voltage divider 18. Turning on of the switches SW1-SW4 results in each of the bottom two resistances 102 of the bottom stage 100 of the voltage divider 18 dropping a voltage ranging from 250-500 volts DC. In this situation, the switching circuit 200 functions to connect the resistances 102 of the bottom stage to each of the converters or inverters 300. For input voltages from 1,000-2,000 volts DC, switches SW1-SW3 are turned on and switch SW4 is turned off. This results in the input potential 12 being dropped across the resistances 102 of the bottom two stages 100 of the voltage divider 18. The switching circuit 200 functions to connect the resistances 102 of the bottom two stages to each of the inputs of the converters or inverters 300 to vary an input potential between 333 to 500 volts which is within the desired operating range of each of the converters or inverters 300. For input potentials 12 from 2,000–3,000 volts DC, switches SW1 and SW2 are turned on and switches SW3 and SW4 are turned off to cause the input potential to be dropped across the bottom three stages 100 of the voltage divider 18. The switching circuit 200 functions to connect the resistances 102 of the bottom three stages 100 of the voltage divider 18 to each of the DC to DC converters or inverters 300 to vary an input potential between 375 and 500 volts DC. For input potentials 12 ranging between 3,000–4,000 volts DC switch SW1 is turned on and switches SW2–SW4 are turned off to cause the input potential to be dropped across the bottom four stages 100 of the voltage divider 18. The switching circuit 200 functions to connect the resistances 102 of the bottom four stages 100 to the DC to DC converters or inverters 300 to vary an input potential between 333–500 volts DC. For input potentials 12 varying from 4,000–5,000 volts DC, each of the switches SW1–SW4 are turned off to cause the input potential to be dropped across the resistances 102 of all five stages of the voltage divider 18. The switch circuit 200 functions to connect the resistances 102 of the five stages 100 of the voltage divider 18 to each of the DC to DC converters or inverters 300 to vary an input potential between 400–500 volts DC.

FIG. 4 illustrates the switching states of the switches 20–92 of the switching circuit 200 for the five voltage ranges discussed above. A "X" represents the switch being turned on by an appropriate output signal from the combinatorial logic circuit 512 and a blank space represents the switch being turned off by an appropriate output from the combinatorial logic circuit.

In the preferred from of the invention, the outputs from the converters or inverters 300 are added by output circuit 400 to produce a regulated output potential 402 on output terminals 404 and 406 which is equal to the sum of the input potentials to cause the output potential 402 to be stepped up from the output potential of the individual converters or inverters. To step up the output potential, the output circuit 400 is a series circuit in which the individual output circuits 408 of the converters or inverters are connected in series. However, it should be understood that alternatively, the present invention may be practiced with the output circuits 408 being connected in parallel where it is desired to not step up the output potential 402 above the output potential of the individual converters or inverters 300 or with other forms of output circuits. Furthermore, it should be understood that each of the converters or inverters 300 may represent a plurality of individual converters or inverters each having a smaller power rating than the combined power output of the converter or inverter with each of the individual converters or inverters being connected in parallel with a regulated output potential. Furthermore, while the preferred embodiment of the present invention produces a regulated output potential 402, it is within the scope of the present invention that the output potential 402 is not regulated.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A power supply for converting variable DC input potential to a DC output potential comprising:

a plurality of DC to DC converters, each converter operating in response to a DC input potential having an operating range, having an input for receiving a DC input potential which is variable in magnitude, and an output for producing the DC output potential, the outputs of the converters being coupled together;

a variable voltage divider having an input coupled to the variable input potential having a range of potential variation larger than the operating range of the converters, a plurality of connected stages coupled to the input potential, at least one control signal applied to the variable voltage divider for controlling a number of stages across which the variable input potential is dropped;

a switching circuit, coupled between the variable voltage divider and the plurality of converters, responsive to at least one switching control signal, for coupling an output potential developed by at least one of the stages to at least one of the converters as a DC input potential so that each converter to which an output potential from one of the stages is coupled has an input potential within an operating range of the converter; and a controller, responsive to the variable input potential, for generating the at least one control signal and the at least one switching signal as a function of the DC input potential.

2. A power supply in accordance with claim 1 wherein:

the output potential of each of the converters is regulated.

3. A power supply in accordance with claim 2 wherein:

the outputs of the converters are coupled in series.

4. A power supply in accordance with claim 3 wherein each voltage divider stage comprises:

at least one resistance with each resistance coupled in a series circuit having first and second nodes;

a stage switch having first and second electrodes respectively electrically connected to the first and second nodes of the series circuit and which are electrically connected together in response to one of the at least one control signal being applied to a control electrode of the stage switch to short circuit the series circuit and which are not electrically connected together in the absence of the one control signal.

5. A power supply in accordance with claim 4 wherein:

a total number of resistances in all of the voltage divider stages is equal to a total number of the DC to DC converters in the power supply.

6. A power supply in accordance with claim 5 wherein:

the controller, in response to the variable input potential, controls the generation of the control signals to control conductivity of the switches.

7. A power supply in accordance with claim 5 wherein:

the switching circuit comprises a plurality of converter selection switches, and further comprising;

a plurality of the resistances each being connectable in parallel to one of the converters by first and second conductors connected respectively to first and second nodes of the resistance and closure of a converter selection switch connected in one of the second conductors in response to one of the switching control signals.

8. A power supply in accordance with claim 7 wherein:
the first conductor connected to each resistance of the plurality of resistances is connected directly to one of the DC to DC converters; and
the second conductor connected to each resistance of the plurality of resistances is connected to at least one converter by closure of at least one converter selection switch which is connected to the second conductor.

9. A power supply in accordance with claim 2 wherein the controller comprises:
a circuit for comparing the variable DC input voltage with a plurality of different voltage thresholds to determine a particular range within which the variable DC input voltage falls within a plurality of different voltage ranges equal in number to the number of stages of the voltage divider; and
a combinatorial logic circuit, coupled to the means for comparing, for producing the at least one control signal and the at least one switching signal in response to the range within which the DC input voltage falls.

10. A power supply in accordance with claim 9 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

11. A power supply in accordance with claim 3 wherein the controller comprises:
a circuit for comparing the variable DC input voltage with a plurality of different voltage thresholds to determine a particular range within which the variable DC input voltage falls within a plurality of different voltage ranges equal in number to the number of stages of the voltage divider; and
a combinatorial logic circuit, coupled to the means for comparing, for producing the at least one control signal and the at least one switching signal in response to the range within which the DC input voltage falls.

12. A power supply in accordance with claim 11 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

13. A power supply in accordance with claim 4 wherein the controller comprises:
a circuit for comparing the variable DC input voltage with a plurality of different voltage thresholds to determine a particular range within which the variable DC input voltage falls within a plurality of different voltage ranges equal in number to the number of stages of the voltage divider; and
a combinatorial logic circuit, coupled to the means for comparing, for producing the at least one control signal and the at least one switching signal in response to the range within which the DC input voltage falls.

14. A power supply in accordance with claim 13 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

15. A power supply in accordance with claim 5 wherein the controller comprises:
a circuit for comparing the variable DC input voltage with a plurality of different voltage thresholds to determine a particular range within which the variable DC input voltage falls within a plurality of different voltage ranges equal in number to the number of stages of the voltage divider; and
a combinatorial logic circuit, coupled to the means for comparing, for producing the at least one control signal and the at least one switching signal in response to the range within which the DC input voltage falls.

16. A power supply in accordance with claim 15 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

17. A power supply in accordance with claim 6 wherein the controller comprises:
a circuit for comparing the variable DC input voltage with a plurality of different voltage thresholds to determine a particular range within which the variable DC input voltage falls within a plurality of different voltage ranges equal in number to the number of stages of the voltage divider; and
a combinatorial logic circuit, coupled to the means for comparing, for producing the at least one control signal and the at least one switching signal in response to the range within which the DC input voltage falls.

18. A power supply in accordance with claim 17 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

19. A power supply in accordance with claim 7 wherein the controller comprises:
a circuit for comparing the variable DC input voltage with a plurality of different voltage thresholds to determine a particular range within which the variable DC input voltage falls within a plurality of different voltage ranges equal in number to the number of stages of the voltage divider; and
a combinatorial logic circuit, coupled to the means for comparing, for producing the at least one control signal and the at least one switching signal in response to the range within which the DC input voltage falls.

20. A power supply in accordance with claim 19 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

21. A power supply in accordance with claim 8 wherein the controller comprises:
means for comparing the variable DC input voltage with a plurality of different voltage thresholds to determine a range within which the variable DC input voltage falls within a plurality of different voltage ranges equal in number to the number of stages of the voltage divider; and
a combinatorial logic circuit, coupled to the means for comparing for producing the at least one control signal and the at least one switching signal in response to the range within which the DC input voltage falls.

22. A power supply in accordance with claim 21 wherein the circuit comprises:
at least one comparator with a number of comparators being equal to one less than a number of stages, each comparator having a pair of inputs with a first input being coupled to the variable DC input potential and a second input being coupled to a voltage threshold with the voltage thresholds being in equally spaced apart.

23. A method of operating a plurality of DC to DC converters which each produce an output DC potential which is combined in an output circuit to produce an output potential with each converter converting a variable DC input potential having a range of potential variation larger than a range of potential variation in which the DC converters are to be operated comprising:
applying the variable DC input potential to a voltage divider having a plurality of stages with each stage having at least one resistance which drops a fraction of the variable DC input potential;
varying the number of stages to which the variable input DC potential is applied as a function of the input potential to cause a DC potential dropped across the at least one resistance of at least one stage to which the variable DC input potential is applied to be within the range of variation that the DC converters ar to be operated; and
connecting the at least one resistance of the at least one stage to which the input potential is applied to at least one converter to cause each converter to be operated within the potential range that the converters ar to be operated.

24. A method in accordance with claim 23 wherein:
the combined output is equal to the sum of the DC output potentials produced by the individual DC to DC converters; and
the outputs of the converters are regulated.

25. A power supply for converting a variable DC input potential to a AC output potential comprising:
a plurality of inverters, each inverter operating in response to a DC input potential having an operating range, having an input for receiving a DC input potential which is variable in magnitude and an output for producing an AC output potential, the outputs of the converters being coupled together;
a variable voltage divider having an input coupled to the variable input potential having a range of potential variation larger than the operating range of inverters, a plurality of connected stages coupled to the input potential, at least one control signal applied to the variable voltage divider for controlling a number of stages across which the variable input potential is dropped;
a switching circuit, coupled between the variable voltage divider and the plurality of inverters, responsive to at least one switching control signal, for coupling an output potential developed by at least one of the sages to at least one of the inverters as a DC input potential so that each inverter to which an output potential from one of the stages is coupled has an input potential within the operating range of the inverters; and
a controller, responsive to the variable input potential, for generating the at least one control signal and the at least one switching signal as a function of the DC input potential.

26. A power supply in accordance with claim 25 wherein:
the AC output potential of the inverters is regulated.

27. A power supply in accordance with claim 26 wherein:
the outputs of the inverters are coupled in series.

28. A power supply as in claim 27 wherein each voltage divider stage comprises:
at least one resistance with each resistance coupled in a series circuit having first and second nodes;
a stage switch having first and second electrodes respectively electrically connected to the first and second nodes of the series circuit and which are electrically connected together in response to one of the at least one control signal being applied to a control electrode of the stage switch to short circuit the series circuit and which are not electrically connected together in the absence of the one control signal.

29. A power supply in accordance with claim 28 wherein:
a total number of resistances in all of the voltage divider stages is equal to a total number of inverters in the power supply.

30. A power supply in accordance with claim 29 wherein:
the controller, in response to the variable input potential, controls the generation of the control signals to control conductivity of the switches.

31. A power supply in accordance with claim 30 wherein:
the switching circuit comprises a plurality of inverter selection switches; and further comprising
a plurality of the resistances each being connectable in parallel to one of the inverters by first and second conductors connected respectively to first and second terminals of the resistance and closure of an inverter selection switch connected in one of the second conductors in response to one of the switching control signals.

32. A power supply in accordance with claim 31 wherein:
the first conductor connected to each resistance of the plurality of resistances is connected directly to one of the inverters; and
the second conductor connected to each resistance of the plurality of resistances is connected to at least one inverter by closure of at least one inverter selection switch which is connected to the second conductor.

33. A power supply in accordance with claim 26 wherein the controller comprises:
- a circuit for comparing the variable DC input voltage with a plurality of different voltage thresholds to determine a particular range within which the variable DC input voltage falls within a plurality of different voltage ranges equal in number to the number of stages of the voltage divider; and
- a combinatorial logic circuit, coupled to the means for comparing, for producing the at least one control signal and the at least one switching signal in response to the range within which the DC input voltage falls.

34. A power supply in accordance with claim 27 wherein the controller comprises:
- a circuit for comparing the variable DC input voltage with a plurality of different voltage thresholds to determine a particular range within which the variable DC input voltage falls within a plurality of different voltage ranges equal in number to the number of stages of the voltage divider; and
- a combinatorial logic circuit, coupled to the means for comparing, for producing the at least one control signal and the at least one switching signal in response to the range within which the DC input voltage falls.

35. A power supply in accordance with claim 28 wherein the controller comprises:
- a circuit for comparing the variable DC input voltage with a plurality of different voltage thresholds to determine a particular range within which the variable DC input voltage falls within a plurality of different voltage ranges equal in number to the number of stages of the voltage divider; and
- a combinatorial logic circuit, coupled to the means for comparing, for producing the at least one control signal and the at least one switching signal in response to the range within which the DC input voltage falls.

36. A power supply in accordance with claim 29 wherein the controller comprises:
- a circuit for comparing the variable DC input voltage with a plurality of different voltage thresholds to determine a particular range within which the variable DC input voltage falls within a plurality of different voltage ranges equal in number to the number of stages of the voltaqe divider: and
- a combinatorial logic circuit, coupled to the means for comparing, for producing the at least one control signal and the at least one switching signal in response to the range within which the DC input voltage falls.

37. A power supply in accordance with claim 30 wherein the controller comprises:
- a circuit for comparing the variable DC input voltage with a plurality of different voltage thresholds to determine a particular range within which the variable DC input voltage falls within a plurality of different voltage ranges equal in number to the number of stages of the voltage divider; and
- a combinatorial logic circuit, coupled to the means for comparing, for producing the at least one control signal and the at least one switching signal in response to the range within which the DC input voltage falls.

38. A power supply in accordance with claim 31 wherein the controller comprises:
- means for comparing the variable DC input voltage with a plurality of different voltage thresholds to determine a range within which the variable DC input voltage falls within a plurality of different voltage ranges equal in number to the number of stages of the voltage divider; and
- a combinatorial logic circuit, coupled to the means for comparing for producing the at least one control signal and the at least one switching signal in response to the range within which the DC input voltage falls.

39. A power supply in accordance with claim 32 wherein the controller comprises:
- a circuit for comparing the variable DC input voltage with a plurality of different voltage thresholds to determine a particular range within which the variable DC input voltage falls within a plurality of different voltage ranges equal in number to the number of stages of the voltage divider; and
- a combinatorial logic circuit, coupled to the means for comparing, for producing the at least one control signal and the at least one switching signal in response to the range within which the DC input voltage falls.

40. A method of operating a plurality of inverters which each produce an AC output potential which is combined in an output circuit to produce an AC output potential with each inverter converting a variable DC input potential having a range of potential variation larger than a range of potential variation in which the inverters are to be operated comprising:
- applying the variable DC input potential to a voltage divider having a plurality of stages with each stage having at least one resistance which drops a portion of the variable input potential;
- varying the number of stages to which the variable input DC potential is applied as a function of the input potential to cause a DC potential dropped across the at least one resistance of the stages to which the variable voltage is applied to be within the range of variation that the inverters are to be operated; and
- connecting each of the at least one resistance of the stages to which the input potential is applied to at least one inverter to cause each inverter to be operated within the potential range that the inverters are to be operated.

* * * * *